United States Patent Office 2,745,620
Patented May 15, 1956

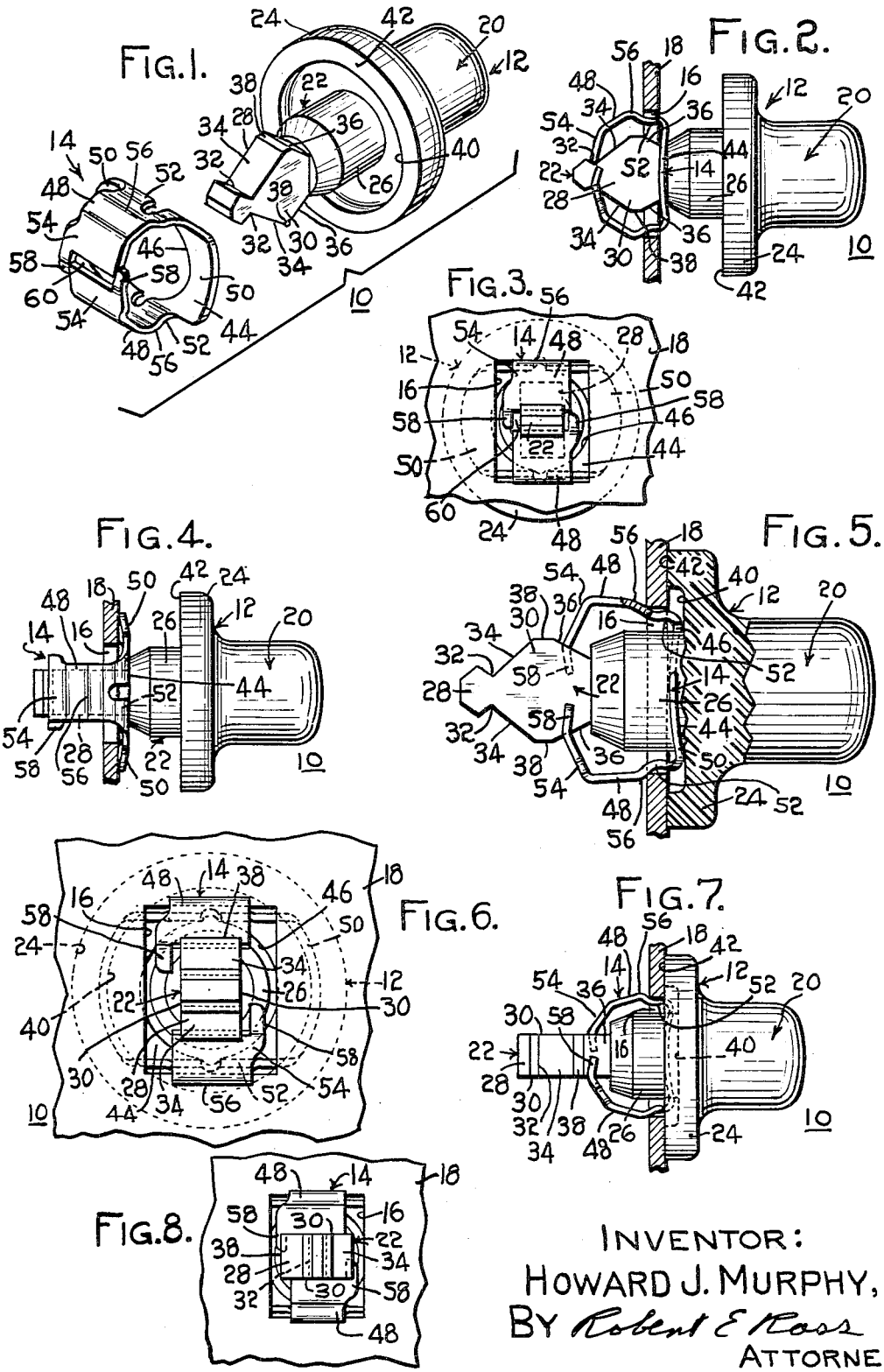
May 15, 1956 — H. J. MURPHY — 2,745,620
FASTENING DEVICE
Filed Aug. 30, 1952
INVENTOR:
HOWARD J. MURPHY,
BY Robert E Ross
ATTORNEY.

2,745,620

FASTENING DEVICE

Howard J. Murphy, Lynnfield, Mass., assignor, by mesne assignments, to United-Carr Fastener Corporation, Boston, Mass., a corporation of Delaware Application August 30, 1952, Serial No. 307,238

2 Claims. (Cl. 248—239)

This invention relates generally to fastening devices, and has particular reference to a fastener for attachment to a supporting panel having an aperture therein.

In the assembly of articles incorporating sheet metal panels, such as refrigerators, automobiles, and the like, it is frequently necessary to attach devices to the panels at various points in the assembly operation when there is no convenient access to the rear of the panel. In other types of assembly operations, although the rear of the panel may be reached conveniently at the time when the fastener is assembled, at some later point in the assembly operation, when access to the rear of the panel is no longer possible, it sometimes becomes necessary, for various reasons, to remove the fastener and replace it.

The object of this invention is to provide a fastener for blind assembly into a supporting panel opening, which is capable of being removed from the opening without damage to either the fastener or the panel.

A further object of the invention is to provide a fastener assembly for attachment into a supporting panel opening, in which a stud is provided with a locking member pre-assembled onto the end thereof which is responsive to axial movement of the stud through the opening to lock into engagement with the panel.

Other objects of the invention will, in part, be obvious, and will, in part, appear hereinafter.

In the drawing:

Fig. 1 is an exploded view of a fastener assembly embodying the features of the invention;

Fig. 2 is a view in elevation of the fastener assembly in position for attachment to a supporting panel;

Fig. 3 is a view of the assembly of Fig. 2 as seen from the left side;

Fig. 4 is a view of the assembly of Fig. 2 as seen from the top;

Fig. 5 is a view in elevation of the fastener assembly completely assembled with the panel; and Fig. 6 is a view in elevation of the fastener after assembly with the panel, in which the stud has been rotated to permit removal of the stud.

Fig. 7 is a view in side elevation of the assembly in which the supporting member has been rotated into position for removal from the panel; Fig. 8 is a view of the assembly of Fig. 7 as seen from the left side.

Referring to the drawing, there is illustrated a fastener assembly 10, which comprises a supporting member 12 and a locking member 14, adapted for blind assembly into an opening 16 in a panel 18 of a refrigerator or the like, to serve as a shelf support.

The supporting member 12, in the illustrated embodiment, is formed of a single piece of molded plastic such as styrene, cellulose acetate, ethyl cellulose, or the like, and is provided with a shelf support portion 20 at one end, a stud portion 22 at the other end, and a flange 24 disposed therebetween. The stud portion 22 is provided with a substantially cylindrical portion 26 adjacent the flange, and an attaching portion 28 extending therefrom which is substantially rectangular in cross section, having a pair of opposite flat sides 30. The other sides of the attaching portion are provided with opposing transverse recesses 32 near the end of the stud portion, inclined surfaces 34 adjacent the recesses which are inclined outwardly away from the end of the stud, and inclined surfaces 36 which are inclined inwardly away from the end of the stud, forming opposing shoulders 38. The flange 24 is also provided with a recess 40 disposed circumferentially about the cylindrical portion 26 on the side of the flange facing the stud 22, thereby forming a peripheral panel bearing rim 42.

The locking member 14 is formed of a single piece of stiff but resilient sheet metal, and comprises a base 44 having a central opening 46 and a pair of locking arms 48 extending from opposite edges of the base. The other edges of the base extend laterally in relation to the arms to provide bearing wings 50. The arms 48 have portions 52 adjacent the base which extend generally normal thereto, and stud engaging free ends 54 which extend inwardly toward each other to grip the stud therebetween. The locking portions 52 of the arms are provided with outwardly extending locking shoulders 56 to engage the panel in a manner to appear hereinafter. The ends of the arms 48 are provided with projecting tongues 58 which substantially span the distance between the arms, leaving a stud-receiving aperture 60 therebetween. The tongues 58 assist in aligning the stud during the insertion thereof, and also prevent tangling of the locking members with each other during manufacture and storage thereof.

To assemble the supporting member 12 and the locking member 14 into the panel opening, the locking member is first assembled onto the end of the stud as illustrated in Fig. 4, so that the stud portion 22 is disposed through the opening 46 in the base, and the free ends 54 of the arms grip the stud on opposite sides thereof in the recesses 32, so that the locking member is securely retained on the stud during subsequent handling and shipping operations.

To assemble the fastener assembly 10 into the panel opening, the stud and the arms 48 of the locking member are inserted into the opening 16 until the wings 50 of the base of the locking member bear against the panel, and the arms 48 extend through the opening. The stud portion 22 may then be forced through the locking member, so that the cylindrical portion 26 enters the opening 46 in the base and the base 44 seats in the recess 40 to allow the peripheral rim 42 to bear against the panel 18. During this movement of the stud the arms 48 ride outwardly on the outwardly inclined surfaces 34 and pass over the shoulders 38 to lock into position on the inwardly inclined surfaces 36. The spreading of the arms resulting therefrom causes the locking shoulders 56 to move outwardly into engagement behind the panel on opposite sides of the opening 16, so that the fastener assembly is securely retained therein (see Figs. 5 and 6).

If it becomes necessary to remove the fastener from the panel, the supporting member 12 may be rotated ninety degrees in a counterclockwise direction as seen from the front of the panel so that the opposing flat sides 30 are gripped between the arms 48 (see Figs. 7 and 8). The width of the stud portion 22 between the opposing flat sides is less than the width between the portion of the inwardly inclined surfaces 36 that is gripped by the arms when the fastener is in the locked position, so that after such rotation, the arms grip the stud portion much less tightly, and since there are no shoulders on the sides 30, the stud may then be removed from the locking member either by a direct pull or by a small amount of tilting of the stud back and forth.

Although in the illustrated embodiment the supporting member 12 is formed of molded plastic, other material may be used. For example, the stud portion may be formed of flat sheet metal, with the shoulders and recess provided by suitable indentations in the opposite edges thereof.

Since certain obvious modifications may be made in the device without departing from the scope of the invention, it is intended that all matter contained herein be interpreted in an illustrative and not in a limiting sense.

I claim:

1. A fastening device for assembly into a panel opening, comprising a stud for entering the opening and a locking member disposed on the end of the stud, said locking member comprising a base having laterally extending wings to bear against one side of the panel, an aperture in the base freely receiving the stud, and a pair of spring arms extending from the base to enter the opening, said arms having free end portions extending toward each other and gripping the stud on opposite sides, said arms having outwardly projecting shoulders disposed near the base, said stud having a flange spaced from the end, recessed portions near the end receiving the ends of the arms, an enlarged arm-spreading portion disposed between the recessed portions and the flange, shoulder portions disposed on the stud between the enlarged arm-spreading portion and the flange, and a shank disposed adjacent the flange which substantially conforms to the shape and size of the aperture in the base, whereby when said stud and attaching member are inserted into the opening until the wings of the base bear against the panel, further movement of the stud into the opening causes the stud to move axially through the locking member so that said shank portion enters the aperture and said arms are spread on the enlarged portion to seat behind the shoulders on the stud thereby forcing the shoulders on the arms into locking engagement behind the panel.

2. A fastening device as set forth in claim 1 in which said stud has a pair of opposing flat sides, whereby said stud may be rotated so that the free end portions of the locking member are adjacent the flat sides to permit removal of the stud.

References Cited in the file of this patent

UNITED STATES PATENTS

| | | |
|---|---|---|
| 1,690,853 | Behrman | Nov. 6, 1928 |
| 1,944,513 | Johnson | Jan. 23, 1934 |
| 2,244,977 | Hansman et al. | June 10, 1941 |
| 2,308,412 | Ballou | Jan. 12, 1943 |
| 2,327,605 | Ryder | Aug. 24, 1943 |
| 2,404,236 | Kost | July 16, 1946 |
| 2,552,066 | Sorensen | May 8, 1951 |
| 2,616,142 | Tinnerman | Nov. 4, 1952 |
| 2,626,772 | Flora | Jan. 27, 1953 |
| 2,640,672 | Bedford | June 2, 1953 |

FOREIGN PATENTS

| | | |
|---|---|---|
| 541,908 | Great Britain | Dec. 17, 1941 |
| 917,022 | France | Dec. 23, 1946 |